United States Patent
Prasad Challa et al.

(10) Patent No.: US 12,194,992 B2
(45) Date of Patent: Jan. 14, 2025

(54) VEHICULAR AUTOMATIC EMERGENCY BRAKING SYSTEM WITH CROSS-PATH THREAT DETERMINATION

(71) Applicant: Magna Electronics Inc., Auburn Hills, MI (US)

(72) Inventors: Venkata Satya Siva Prasad Challa, Troy, MI (US); Kirti Hiranand Balani, Maharashtra (IN)

(73) Assignee: Magna Electronics Inc., Auburn Hills, MI (US)

( * ) Notice: Subject to any disclaimer, the term of this patent is extended or adjusted under 35 U.S.C. 154(b) by 271 days.

(21) Appl. No.: 17/810,380

(22) Filed: Jul. 1, 2022

(65) Prior Publication Data

US 2023/0001923 A1    Jan. 5, 2023

Related U.S. Application Data

(60) Provisional application No. 63/261,517, filed on Sep. 23, 2021, provisional application No. 63/202,953, filed on Jul. 1, 2021.

(51) Int. Cl.
*B60W 30/095*     (2012.01)
*B60W 30/18*      (2012.01)

(52) U.S. Cl.
CPC .... *B60W 30/0956* (2013.01); *B60W 30/0953* (2013.01); *B60W 30/18109* (2013.01); *B60W 2510/18* (2013.01); *B60W 2554/4049* (2020.02)

(58) Field of Classification Search
CPC ......... B60W 30/0956; B60W 30/0953; B60W 30/18109; B60W 2554/4049; B60W 2510/18

See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |

(Continued)

*Primary Examiner* — Michael D Lang
(74) *Attorney, Agent, or Firm* — HONIGMAN LLP

(57) ABSTRACT

A vehicular control system includes a sensor disposed at a vehicle and capturing sensor data. The system, as the vehicle is approaching an intersection and responsive to processing by a processor of sensor data captured by the sensor, detects a cross-traffic threat approaching the intersection and maintains a buffer to store a trajectory of the cross-traffic threat. The system, using the trajectory, determines an intersection point between the vehicle and the cross-traffic threat, determines an arrival time at the intersection point for both the vehicle and the cross-traffic threat, and determines a difference between the arrival time of the vehicle at the intersection and the cross-traffic threat. The system, responsive to determining that the difference between the arrival time of the equipped vehicle at the intersection and the arrival time of the cross-traffic threat is less than a threshold amount, controls a safety system of the vehicle.

18 Claims, 7 Drawing Sheets

(56) References Cited

U.S. PATENT DOCUMENTS

| | | |
|---|---|---|
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,688,199 B2 | 6/2017 | Koravadi |
| 9,689,967 B1 | 6/2017 | Stark et al. |
| 9,753,121 B1 | 9/2017 | Davis et al. |
| 9,869,762 B1 | 1/2018 | Alland et al. |
| 9,925,980 B2 | 3/2018 | Edo Ros |
| 9,954,955 B2 | 4/2018 | Davis et al. |
| 10,032,369 B2 | 7/2018 | Koravadi |
| 10,071,687 B2 | 9/2018 | Ihlenburg et al. |
| 10,099,614 B2 | 10/2018 | Diessner |
| 10,347,129 B2 | 7/2019 | Koravadi |
| 10,462,354 B2 | 10/2019 | Koravadi |
| 10,688,993 B2 | 6/2020 | Johnson et al. |
| 10,866,306 B2 | 12/2020 | Maher et al. |
| 2010/0245066 A1 | 9/2010 | Sarioglu et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0232958 A1* | 8/2019 | Deng ................. B60T 7/22 |
| 2019/0266416 A1* | 8/2019 | Hung ................. G06V 20/56 |
| 2019/0339382 A1 | 11/2019 | Hess et al. |
| 2021/0155241 A1 | 5/2021 | Joseph et al. |

* cited by examiner

- Target Lateral buffer, TgtLatBuf = $[0]_{m*n}$
- Target Longitudinal buffer, TgtLongBuf = $[0]_{m*n}$
- Target buffer counter cnt = $[0]_m$
- Host Lateral buffer, HostLatBuf = $[0]_{1*n}$
- Host Longitudinal buffer, HostLongBuf = $[0]_{1*n}$
- Host buffer counter cntHost = $[0]$
- TgtLatBuf [0,1...m-1][0] = objY[0,1...m-1]
- TgtLongBuf [0,1,...m-1][0] = objX[0,1...m-1]

Where m = number of targets for which the path history should be stored
n = number of samples/points that should be stored for each target/Host
ObjY = Current lateral distance of target w.r.t host
ObjX = Current longitudinal distance of target w.r.t host

FIG. 3A

```
TgtLatBuf [0,1...m-1][1,...n-1] = TgtLatBuf [0,1,...n-2]
TgtLongBuf [0,1...m-1][1,...n-1] = TgtLongBuf [0,1,...n-2]
TgtLatBuf [0,1...m-1][0] = objY[0,1..m-1]
TgtLongBuf [0,1...m-1][0] = objX[0,1..m-1]
HostLatBuf [0] [1,...n-1] = HostLatBuf [0][0,1,...n-2]
HostLongBuf [0][1,...n-1] = HostLongBuf [0][0,1,...n-2]
HostLatBuf [0] [0]= 0
HostLongBuf [0][0] = 0
```

FIG. 3B

TgtLongBuf(i) = (x * cos(da)) + (y * sin(da)); %Transformation of previous target points w.r.t current host point
TgtLatBuf(i) = - (x * sin(da)) + (y * cos(da));
HostLongBuf(i) = (x * cos(da)) + (y * sin(da)); %Transformation of previous host points w.r.t current host point
HostLatBuf(i) = - (x * sin(da)) + (y * cos(da));

Where x = TgtLongBuf(i) – dx or x =HostLongBuf(i) – dx
y= TgtLatBuf(i) – dy or Y= HostLatBuf (i) – dy
da = rotational angle of host = yawrate *sampletime
dx = longitudinal distance covered by host in the given sample
dy = lateral distance covered by host in the given sample
i = index starting from 1 to the element counter cnt

FIG. 3C

Traffic Scenario and Environment

1. Host & Target vehicle' speed variation (e.g., Constant, Variable)
2. Host & Target vehicle' speed range (e.g., 0kmph to 70kmph)
3. Number of object(s) (e.g., 0 to 20)
4. Distance between host (ego) and target vehicle (e.g., 30m to 100m)
5. Host Road type ( straight Vs curved)
6. Target Road type ( straight Vs curved)
7. Target moving status (Oncoming, stationary, same direction etc.,)

FIG. 4

VEHICULAR AUTOMATIC EMERGENCY BRAKING SYSTEM WITH CROSS-PATH THREAT DETERMINATION

CROSS REFERENCE TO RELATED APPLICATIONS

The present application claims priority of U.S. provisional application Ser. No. 63/261,517, filed Sep. 23, 2021, and U.S. provisional application Ser. No. 63/202,953, filed Jul. 1, 2021, which are hereby incorporated herein by reference in their entireties.

FIELD OF THE INVENTION

The present invention relates generally to a vehicle control system for a vehicle and, more particularly, to a vehicle control system that utilizes one or more sensors at a vehicle.

BACKGROUND OF THE INVENTION

Use of sensors in vehicle imaging systems is common and known. Examples of known imaging sensor systems are described in U.S. Pat. Nos. 10,688,993; 9,925,980; 5,949,331; 5,670,935 and/or 5,550,677, which are hereby incorporated herein by reference in their entireties.

SUMMARY OF THE INVENTION

A vehicular control system includes a sensor disposed at a vehicle equipped with the vehicular control system and sensing exterior and at least forward of the vehicle, the sensor capturing sensor data. The system includes an electronic control unit (ECU) including electronic circuitry and associated software. The electronic circuitry of the ECU includes a processor for processing sensor data captured by the sensor. The vehicular control system, as the equipped vehicle is approaching an intersection that intersects a roadway along which the equipped vehicle is currently traveling and responsive to processing by the processor of sensor data captured by the sensor, detects a position of at least one cross-traffic threat approaching the intersection from a different roadway than the roadway the equipped vehicle is traveling along. The vehicular control system maintains at least one buffer for each respective detected cross-traffic threat, and each buffer stores a trajectory of the respective cross-traffic threat. The trajectory includes a plurality of detected positions of the respective cross-traffic threat as the respective cross-traffic threat travels along the different roadway toward the intersection ahead of the equipped vehicle. The vehicular control system, as the equipped vehicle approaches the intersection, and using the trajectory stored in the buffer of the respective cross-traffic threat, determines a potential intersection point between the equipped vehicle and the at least one cross-traffic threat. The vehicular control system, responsive to determining the potential intersection point, determines an arrival time at the potential intersection point for the equipped vehicle and an arrival time at the potential intersection point for the at least one cross-traffic threat and determines a difference between the arrival time of the equipped vehicle at the intersection and the arrival time of the at least one cross-traffic threat. The vehicular control system, responsive to determining that the difference between the arrival time of the equipped vehicle at the intersection and the arrival time of the at least one cross-traffic threat is less than a threshold amount, controls a safety system of the vehicle.

These and other objects, advantages, purposes and features of the present invention will become apparent upon review of the following specification in conjunction with the drawings.

BRIEF DESCRIPTION OF THE DRAWINGS

FIGS. 3A-3C are schematic views of buffers storing samples of attributes for the control system of FIG. 1;

FIG. 4 is a table of traffic scenarios and environments for operation of the control system of FIG. 1.

DESCRIPTION OF THE PREFERRED EMBODIMENTS

A vehicle control system and/or driver or driving assist system and/or object detection system and/or alert system operates to capture sensor data representative of the exterior of the vehicle and may process the captured sensor data to detect objects at or near the vehicle and in the predicted path of the vehicle, such as to assist a driver of the vehicle in maneuvering the vehicle in a forward or rearward direction. The control system includes a data processor (such as an image processor or image processing system) that is operable to receive sensor data from one or more sensors (such as image data from one or more cameras). The system may process captured image data and provide an output to a display device for displaying images representative of the captured image data. Optionally, the control system may provide display, such as a rearview display or a top down or bird's eye or surround view display or the like.

Figure 1:
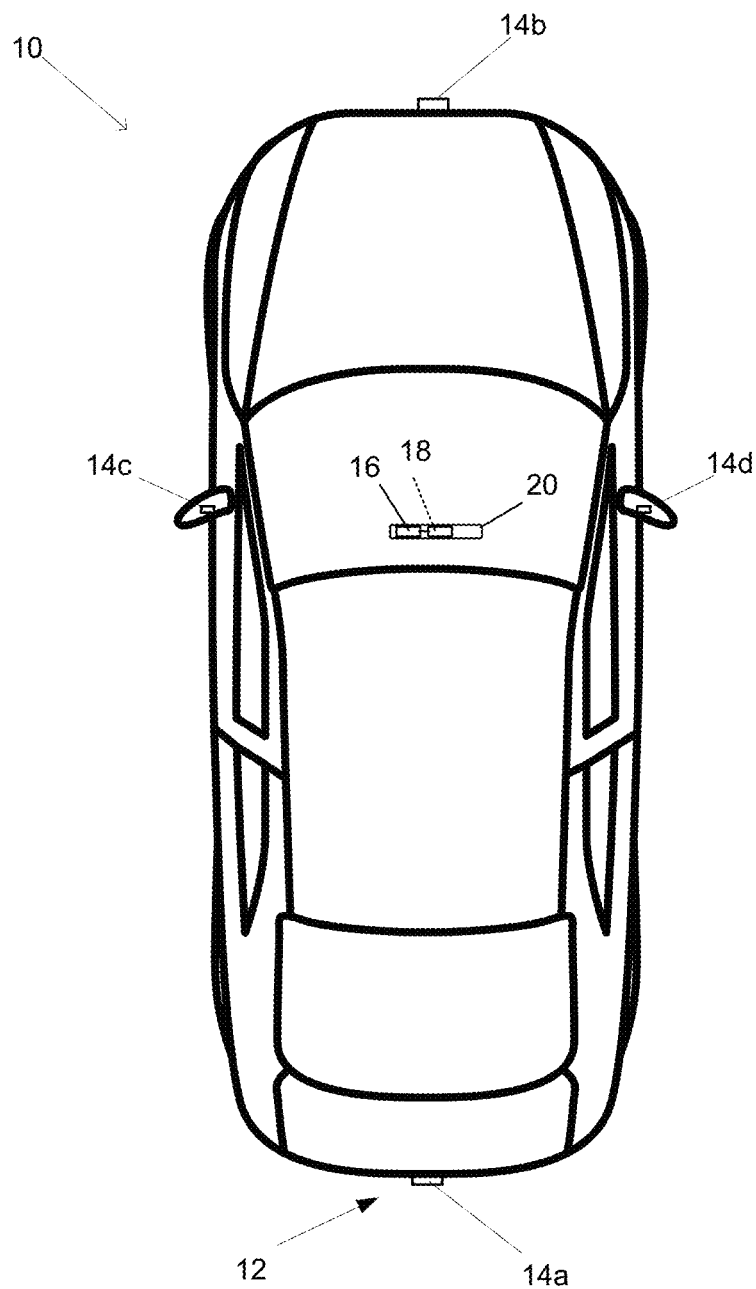
FIG. 1 is a plan view of a vehicle with a control system that incorporates sensors such as cameras or radar sensors.

Referring now to the drawings and the illustrative embodiments depicted therein, a vehicle 10 includes a sensing system 12 that includes at least one exterior sensing sensor, such as at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). The sensors 14a, 14b, 14c, 14d in FIG. 1 may comprise exterior viewing cameras and/or exterior sensing sensors (e.g., radar sensors and/or lidar sensors). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The sensing system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Cross-path crashes/collisions are a significant issue for automobile users. These crashes may occur from malfunctioning traffic signals, bad weather conditions, out-of-sight cross path vehicles, etc. These cross-path object often lead to accidents causing different injuries and at the very least often require stressful emergency braking by the driver. Threats from cross-paths objects are often difficult for the driver to see and react to. Thus, a system that detects these threats automatically and sends control commands to advanced driver-assistance systems (ADAS) such as autonomous emergency braking (AEB) systems can improve occupant safety.

Implementations herein include systems and methods to detect cross-path target objects using one or more forward-viewing sensors (e.g., radar, lidar, cameras, etc.) installed at a vehicle. The system may utilize radar sensors, lidar sensors, and/or cameras, whereby the data captured by the different sensors is fused and processed at the ECU to detect or determine cross-traffic objects and to determine a potential collision threat of the detected cross-traffic object with the subject vehicle. The system may calculate metrics for each threat using target object (i.e., the detected cross-traffic object, such as, for example, another vehicle, a pedestrian, or a bicycle) attributes and subject vehicle (SV) (i.e., the host vehicle or equipped vehicle) attributes. For example, the metrics/attributes include time to reach the junction/intersection for the target object (e.g., a target vehicle or pedestrian or bicycle), intersection location of the target object and the subject vehicle, and/or time to reach the junction/intersection for the SV. The system may determine the most critical threat(s) and alert the driver of the threat(s) accordingly (e.g., via visual, audible, and/or haptic notifications). Optionally, the system controls aspects of the SV (e.g., braking, steering, steering, etc.) so that the SV can be slowed or halted before reaching the intersection point or maneuvered out of the way when a critical threat is identified.

The system provides accurate cross-traffic path monitoring and threat determination capabilities using sensor data captured by front and/or side sensors (e.g., corner/forward sensing radar and/or cameras) of the vehicle. Each target object detected by the sensors of the SV may carry an associated attribute list that defines the state of the detected target object. The system may use object data obtained from pre-processed sensor data. The attributes of the detected target objects may include relative velocity, longitudinal/lateral distance with respect to equipped vehicle, width, length, etc.

Figure 2:
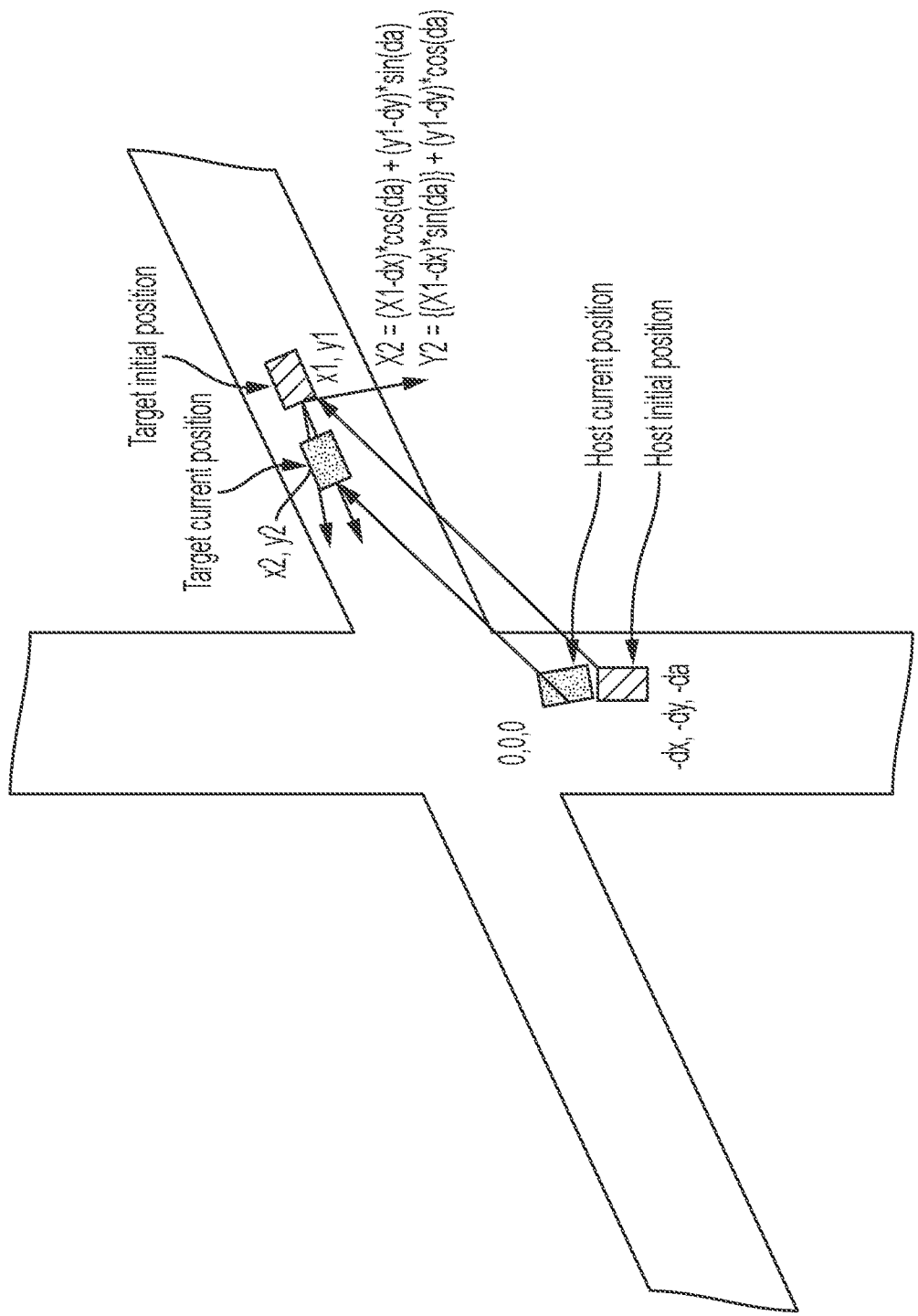
FIG. 2 is a schematic view of a subject vehicle approaching an intersection at the same time as a target object on a cross-path with the subject vehicle.

Referring now to FIG. 2, the system may provide path tracking for both the target objects and the subject vehicle. Optionally, the system tracks the paths of the SV and the target objects using variable origin methodology. The path tracking may utilize target attributes such as relative distance (both longitudinal and lateral) with respect to the SV (i.e., the distance between the target object and the subject vehicle). The system may use host yaw rate and host velocity for localization whenever appropriate. Other means of localization may also be used (e.g., GPS systems).

The system may detect multiple potential cross-traffic threats simultaneously. Optionally, the system maintains two or more buffers for every detected cross-path traffic object which may include the historical trajectory of the detected target object for both lateral and longitudinal orientations. The buffer size may be configurable depending on the situation (e.g., speed of the equipped vehicle, speed of the target object, environmental conditions, etc.) and may be populated based on SV travel distance. At every buffer point update, the system may adjust (e.g., rotate and translate) some or all of the previous filled points of the buffer relative to the current position of the subject vehicle (i.e., a current host position becomes the new origin coordinate (0,0,0)), such as by using variable origin/moving origin techniques.

As shown in FIG. 3A, the system may initialize buffers for lateral and/or longitudinal target object and/or subject vehicle points and element counter counts to zero. The system may add a new entry or point to the buffer whenever the subject vehicle has traveled more than a threshold distance (i.e., DistHost>=minDistrTravel). That is, when the subject vehicle (i.e., the equipped vehicle) has traveled at least some minimum distance (e.g., at least one meter, at least five meters, at least ten meters, etc.), the system updates all buffers at that sample. The minimum distance may be preset or configurable or selectable. The minimum distance may be adjustable depending on factors such as vehicle speed and environmental conditions (e.g., temperature, precipitation, etc.).

Optionally, the system may model the distance travelled by the subject vehicle at any given instance in time as shown in Equation (1):

$$\text{DistHost} = \text{PrevDistHost} + V*dt \qquad (1)$$

Here, PrevDistHost is equal to DistHost at the previous time sample, V is equal to the subject vehicle velocity, dt is equal to the sample time of the algorithm, and minDistTravel is equal to a configurable parameter specifying the minimum distance travelled by the subject vehicle (i.e., equipped vehicle) before the buffer should be updated. The DistHost variable may be reset to zero after the subject vehicle achieves (i.e., travels) the minDistTravel.

Referring now to FIG. 3B, optionally, for every new buffer point, the system inserts objX and objY representing the current longitudinal and lateral target position of the target object and the subject vehicle at the start index of the buffers. The system may increment an element counter count (e.g., by one) for the index. Prior to inserting the new objects, the system may shift the other elements in the buffers by one to accommodate the current positions at the start index of the buffers. Referring now to FIG. 3C, optionally, for all preceding element in the buffer, the system may translate (i.e., −dx and −dy) and rotate (i.e., −da) each element. When the element counter is greater than a maximum count, the system may follow first in first out (FIFO) methodology to update the target object and the subject vehicle buffer points.

After tracking the target object and the subject vehicle, the system may predict a path for both the subject vehicle and the target object from their respective current locations. This involves extrapolating the path travelled by the target object and the subject vehicle by using the previous trajectories of the respective vehicles through, for example, curve fitting. For the subject vehicle, the degree of curve fit relies on the distribution of the lateral and longitudinal distances of subject vehicle buffer points. For the target object, the degree of curve fit relies on distribution of longitudinal as well as lateral distances of the target object buffer points. Based on the curve fit, the system derives a number of parameters. For example, the system determines a radius of curvature and polynomial coefficients for both the subject vehicle and the target object paths. The number of coefficients may depend on which polynomial degree is best fitted to the paths. When the junction/intersection point is directly provided from the sensors, the system may determine longitudinal and lateral distances to the intersection point from the subject vehicle given the curved distance to the intersection point when subject vehicle is traveling along a circular or curved path. The radius of the curved path of the subject vehicle ($R_{host}$) may be represented by Equation (2):

$$R_{host}=1/(2*a) \qquad (2)$$

Here, a is coefficient from the polynomial equation derived from the curve fit. This determines whether the subject vehicle is traveling along a curved or straight path or trajectory.

$$\theta_{host} = \frac{D_{instersec}}{R_{host}} \qquad (3)$$

In Equation (3), $D_{intersec}$ is the curved distance to the intersection while $\theta_{host}$ is the angle of curvature. The longitudinal distance ($D_{long}$) is equivalent to $R_{host}*\sin(\theta_{host})$. The lateral distance ($D_{lat}$) is equivalent to $R_{host}*(1-\cos(\theta_{host}))$.

The system may calculate the intersection point if or when the junction and/or intersection point is not provided directly from sensors. For example, using the predicted paths calculated in previous steps, the system calculates the intersection point between the two polynomials by simultaneously solving the polynomial equations and using the roots as intersection point. The intersection point is the distance from subject vehicle's current position to the intersection/crash point between the subject vehicle and the target object.

The system may calculate a target object time and a host vehicle time to reach the junction/intersection. For example, using kinematics equation such as $s=ut+at^2/2$, the system may calculate (e.g., using the velocities and accelerations of the subject vehicle and the target object and/or the calculated distances to the intersection for the subject vehicle and the target object) the time for the subject vehicle to reach the junction/intersection and the time for the target object to reach the same junction/intersection. When the target time to reach the intersection and the host time to reach the intersection is less than a threshold period of time (e.g., a configurable threshold period of time such as less than or equal to about one second or three seconds), the system defines the target object as a threat.

Optionally, the system determines the most critical threat out of each of a plurality of detected threats. For example, given all the threats detected, the system determines the difference between the target object (detected threat) time to reach the intersection and subject vehicle time to intersection. The threat corresponding to the minimum difference in time may be defined as the most critical threat. That is, the threat that the system determines is arriving at the intersection at a time closest to that of the subject vehicle may be the most critical threat. For example, if the difference between when a first threat and the subject vehicle arriving at an intersection is 1.5 seconds, and the difference between when a second threat and the subject vehicle arriving at the intersection is 0.5 seconds, the system may classify the second threat as more critical than the first threat. The threat of each object may be weighted by other factors, such as size and/or speed of the target object.

The system may hold and predict the position of each target object (i.e., threat). Optionally, the system may track lost target objects. A lost target object may be a target object that the sensor data indicates is no longer present, which may be the result of sensor data error, noise, movement of the target object, temporary loss of line-of-sight, etc. When a target object is classified as lost, the system may assume the target object maintains the same relative velocity that the system determined the target object had at the previous sample prior to the target object being lost. Using the previous sample velocity, the system may predict the distance of the lost target object at the current sample (i.e., using equation Velocity=distance/time). The system may continue to predict the distances of the lost target object for a configurable period of time (i.e., a configurable number of time samples such as three seconds). If the lost target object is still not reported by sensor data after the configurable amount of time samples (i.e., is still lost), the system may stop predicting the position of the target object and clear the corresponding target buffers. If the lost target is detected within sensor data within the configurable amount of time samples, the system may restore the target object's values in the buffer and stop predicting the distances based on the previous velocity.

Referring now to FIG. 4, the system may reliably identify, classify, and categorize threats of cross-traffic objects in a variety of different traffic scenarios and environments. For example, the subject vehicle and target object may have constant or variable speed differences and ranges, the distance between the subject vehicle and the target object may have large variance, and the road may be curved or straight. The system accounts for these different traffic scenarios and environments based on the attributes of the vehicles as discussed above.

Figure 5:
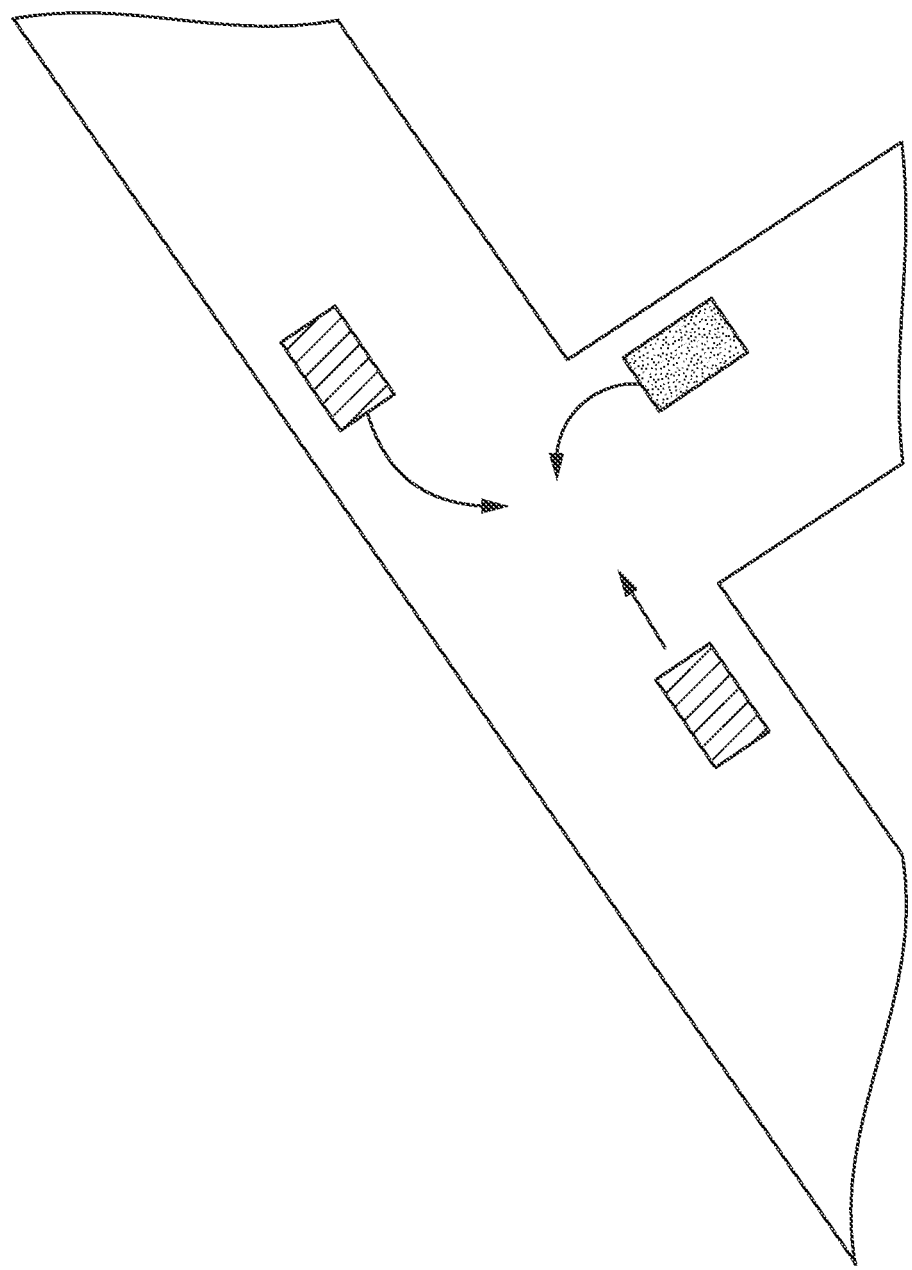
FIG. 5 is a schematic view of a subject vehicle approaching an intersection with two potential cross-traffic threats.

Referring now to FIG. 5, thus the driver assistance system determines cross-path threats for a vehicle, such as straight cross-path threats, using different attributes of the subject vehicle and the potential threats. The system may be incorporated into an autonomous driving application and/or automatic emergency braking systems to assist in automatic emergency braking with respect to threats detected on a cross-path with the subject vehicle.

While examples herein discuss image sensors such as cameras, the system is applicable to many different types of sensors. For example, the system may detect cross path target objects using one or more forward-viewing sensors such as radar sensors, lidar sensors, cameras, ultrasonic sensors, etc. (and any combination thereof). The sensors may include separate or independent processing capabilities that perform some or all of the functions described herein. A vehicle ECU may receive data from the sensors and perform some or all of the processing. For example, a front camera hardware module may include an ECU that includes an image processor for executing some portion of the cross path feature software. Another example includes a front camera hardware module that includes a processor that executes a portion of the functionality of the cross path detection system and a separate ECU (e.g., a vehicle ECU) executes a different portion of the functionality. Some or all of the system may be executed by separate hardware, such as a domain controller.

Similarly, other sensors, such as radar sensors, may include local processing capabilities. For example, a front radar hardware ECU may perform way object detection, tracking, and some or all of the cross path system functionality. In another example, the radar sensor merely performs object detection and tracking while a separate ECU executes the cross path system functionality (e.g., another ECU or separate hardware such as a domain controller).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the control system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
   a sensor disposed at a vehicle equipped with the vehicular control system and sensing exterior and at least forward of the vehicle, the sensor capturing sensor data;
   an electronic control unit (ECU) comprising electronic circuitry and associated software;

wherein the electronic circuitry of the ECU comprises a processor for processing sensor data captured by the sensor;

wherein the vehicular control system, as the equipped vehicle is approaching an intersection that intersects a roadway along which the equipped vehicle is currently traveling and responsive to processing by the processor of sensor data captured by the sensor, detects a position of at least one cross-traffic threat approaching the intersection from a different roadway than the roadway the equipped vehicle is traveling along;

wherein the vehicular control system maintains at least two buffers for each respective detected cross-traffic threat, and wherein the at least two buffers comprise (i) a lateral buffer and (ii) a longitudinal buffer independent from the lateral buffer, and wherein the lateral buffer stores a lateral trajectory of the respective cross-traffic threat, and wherein the longitudinal buffer stores a longitudinal trajectory of the respective cross-traffic threat, and wherein each of the lateral trajectory and the longitudinal trajectory comprises a plurality of detected positions of the respective cross-traffic threat as the respective cross-traffic threat travels along the different roadway toward the intersection ahead of the equipped vehicle;

wherein the vehicular control system, as the equipped vehicle approaches the intersection, and using the trajectory stored in the at least two buffers of the respective cross-traffic threat, determines a potential intersection point between the equipped vehicle and the at least one cross-traffic threat;

wherein the vehicular control system, responsive to determining the potential intersection point, determines an arrival time at the potential intersection point for the equipped vehicle and an arrival time at the potential intersection point for the at least one cross-traffic threat;

wherein the vehicular control system determines a difference between the arrival time of the equipped vehicle at the intersection and the arrival time of the at least one cross-traffic threat; and wherein the vehicular control system, responsive to determining that the difference between the arrival time of the equipped vehicle at the intersection and the arrival time of the at least one cross-traffic threat is less than a threshold amount, controls a safety system of the vehicle.

2. The vehicular control system of claim 1, wherein the vehicular control system determines the potential intersection point using variable origin methodology.

3. The vehicular control system of claim 1, wherein each buffer comprises a configurable buffer size that is configurable based on a speed of the equipped vehicle.

4. The vehicular control system of claim 1, wherein the vehicular control system periodically updates the at least two buffers based on a current position of the equipped vehicle.

5. The vehicular control system of claim 4, wherein the vehicular control system updates the at least two buffers after the equipped vehicle has traveled more than a threshold distance.

6. The vehicular control system of claim 1, wherein the vehicular control system determines the potential intersection point based on a path prediction of the equipped vehicle and a path prediction of the at least one cross-traffic threat.

7. The vehicular control system of claim 6, wherein the path prediction of the equipped vehicle and the path prediction of the at least one cross-traffic threat are based on curve fitting.

8. The vehicular control system of claim 1, wherein the at least one cross-traffic threat comprises a plurality of cross-traffic threats, and wherein the vehicular control system classifies each of the plurality of cross-traffic threats based on the difference between the arrival time of the equipped vehicle at the intersection and the arrival time of the corresponding cross-traffic threat of the plurality of cross-traffic threats.

9. The vehicular control system of claim 1, wherein in the vehicular control system, responsive to processing by the processor of sensor data captured by the sensor, determines that one of the at least one cross-traffic threat is lost, and wherein the vehicular control system predicts a position of the lost cross-traffic threat for a threshold period of time.

10. The vehicular control system of claim 9, wherein the vehicular control system determines that, after the threshold period of time has elapsed, the lost cross-traffic threat is still lost, the vehicular control system halts further prediction of the position of the lost cross-traffic threat.

11. The vehicular control system of claim 1, wherein the safety system comprises an automatic emergency braking system.

12. The vehicular control system of claim 1, wherein the vehicular control system determines distance travelled by the equipped vehicle as the equipped vehicle approaches the intersection and after detecting at least one cross-traffic threat approaching the intersection, and wherein the vehicular control system, responsive to determining that the equipped vehicle has traveled more than a threshold distance, adjusts at least one of the plurality of detected positions of the detected at least one cross-traffic threat stored in the at least two buffers based on a current location of the equipped vehicle.

13. A vehicular control system, the vehicular control system comprising:

a sensor disposed at a vehicle equipped with the vehicular control system and sensing exterior and at least forward of the vehicle, the sensor capturing sensor data;

an electronic control unit (ECU) comprising electronic circuitry and associated software;

wherein the electronic circuitry of the ECU comprises a processor for processing sensor data captured by the sensor;

wherein the vehicular control system, as the equipped vehicle is approaching an intersection that intersects a roadway along which the equipped vehicle is currently traveling and responsive to processing by the processor of sensor data captured by the sensor, detects a position for each of a plurality of cross-traffic threats approaching the intersection from a different roadway than the roadway the equipped vehicle is traveling along;

wherein the vehicular control system maintains at least two buffers for each respective detected cross-traffic threat of the plurality of cross-traffic threats, and wherein the at least two buffers comprise (i) a lateral buffer and (ii) a longitudinal buffer independent from the lateral buffer, and wherein the lateral buffer stores a lateral trajectory of the respective cross-traffic threat, and wherein the longitudinal buffer stores a longitudinal trajectory of the respective cross-traffic threat, and wherein each of the lateral trajectory and the longitudinal trajectory comprises a plurality of detected positions of the respective cross-traffic threat as the respective cross-traffic threat travels along the different roadway toward the intersection ahead of the equipped vehicle;

wherein the vehicular control system, for each respective cross-traffic threat as the equipped vehicle approaches the intersection, and using the trajectory stored in the at least two buffers of the respective cross-traffic threat, determines a corresponding potential intersection point between the equipped vehicle and the respective cross-traffic threat;

wherein the vehicular control system, for each respective cross-traffic threat, responsive to determining the corresponding potential intersection point, determines an arrival time at the potential intersection point for the equipped vehicle and an arrival time at the potential intersection point for the respective cross-traffic threat;

wherein the vehicular control system, for each respective cross-traffic threat, determines a difference between the arrival time of the equipped vehicle at the intersection and the arrival time of the respective cross-traffic threat;

wherein the vehicular control system, using the difference between the arrival time of the equipped vehicle at the intersection and the arrival time of each respective cross-traffic threat, determines a most critical cross-traffic threat; and wherein the vehicular control system, responsive to determining that the difference between the arrival time of the equipped vehicle at the intersection and the arrival time of the most critical cross-traffic threat is less than a threshold amount, controls a safety system of the vehicle.

14. The vehicular control system of claim 13, wherein each buffer comprises a configurable buffer size that is configurable based on a speed of the equipped vehicle.

15. A vehicular control system, the vehicular control system comprising:

a sensor disposed at a vehicle equipped with the vehicular control system and sensing exterior and at least forward of the vehicle, the sensor capturing sensor data;

an electronic control unit (ECU) comprising electronic circuitry and associated software;

wherein the electronic circuitry of the ECU comprises a processor for processing sensor data captured by the sensor;

wherein the vehicular control system, as the equipped vehicle is approaching an intersection that intersects a roadway along which the equipped vehicle is currently traveling and responsive to processing by the processor of sensor data captured by the sensor, detects a position of at least one cross-traffic threat approaching the intersection from a different roadway than the roadway the equipped vehicle is traveling along;

wherein the vehicular control system maintains a pair of buffers for each respective detected cross-traffic threat, and wherein each pair of buffers stores a trajectory of the respective cross-traffic threat, and wherein the trajectory comprises a plurality of detected positions of the respective cross-traffic threat as the respective cross-traffic threat travels along the different roadway toward the intersection ahead of the equipped vehicle, and wherein a first buffer of the pair of buffers stores lateral orientations of the respective cross-traffic threat, and wherein a second buffer of the pair of buffers stores longitudinal orientations of the respective cross-traffic threat;

wherein the vehicular control system, as the equipped vehicle approaches the intersection, and using the trajectory stored in the pair of buffers of the respective cross-traffic threat, determines a potential intersection point between the equipped vehicle and the at least one cross-traffic threat;

wherein the vehicular control system, responsive to determining the potential intersection point, determines an arrival time at the potential intersection point for the equipped vehicle and an arrival time at the potential intersection point for the at least one cross-traffic threat;

wherein the vehicular control system determines a difference between the arrival time of the equipped vehicle at the intersection and the arrival time of the at least one cross-traffic threat; and wherein the vehicular control system, responsive to determining that the difference between the arrival time of the equipped vehicle at the intersection and the arrival time of the at least one cross-traffic threat is less than a threshold amount, controls a safety system of the vehicle.

16. The vehicular control system of claim 15, wherein the vehicular control system periodically updates the pair of buffers based on a current position of the equipped vehicle.

17. The vehicular control system of claim 16, wherein the vehicular control system updates the pair of buffers after the equipped vehicle has traveled more than a threshold distance.

18. The vehicular control system of claim 15, wherein the vehicular control system determines distance travelled by the equipped vehicle as the equipped vehicle approaches the intersection and after detecting at least one cross-traffic threat approaching the intersection, and wherein the vehicular control system, responsive to determining that the equipped vehicle has traveled more than a threshold distance, adjusts at least one of the plurality of detected positions of the detected at least one cross-traffic threat stored in the pair of buffers based on a current location of the equipped vehicle.

* * * * *

UNITED STATES PATENT AND TRADEMARK OFFICE
CERTIFICATE OF CORRECTION

PATENT NO. : 12,194,992 B2
APPLICATION NO. : 17/810380
DATED : January 14, 2025
INVENTOR(S) : Venkata Satya Siva Prasad Challa et al.

Page 1 of 1

It is certified that error appears in the above-identified patent and that said Letters Patent is hereby corrected as shown below:

In the Specification

Column 4
Line 33, "Vis" should be --V is--

Column 5
Line 13, "Here, a is" should be --Here, $\alpha$ is--

Signed and Sealed this
Eleventh Day of February, 2025

Coke Morgan Stewart
*Acting Director of the United States Patent and Trademark Office*